(12) United States Patent
Kimura (10) Patent No.: US 9,567,001 B2
(45) Date of Patent: Feb. 14, 2017

(54) ELECTRIC POWER STEERING APPARATUS

(75) Inventor: Kazushi Kimura, Hyogo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 13/991,082

(22) PCT Filed: Apr. 22, 2011

(86) PCT No.: PCT/JP2011/059944
§ 371 (c)(1),
(2), (4) Date: May 31, 2013

(87) PCT Pub. No.: WO2012/144069
PCT Pub. Date: Oct. 26, 2012

(65) Prior Publication Data
US 2013/0253766 A1    Sep. 26, 2013

(51) Int. Cl.
*B62D 5/04* (2006.01)

(52) U.S. Cl.
CPC ............ *B62D 5/046* (2013.01); *B62D 5/0463* (2013.01); *B62D 5/0481* (2013.01); *B62D 5/0484* (2013.01)

(58) Field of Classification Search
USPC .................................................... 701/41, 43
See application file for complete search history.

(56) References Cited

U.S. PATENT DOCUMENTS

| | | | |
|---|---|---|---|
| 4,624,335 A | 11/1986 | Shiraishi et al. | |
| 5,078,225 A | 1/1992 | Ohmura et al. | |
| 5,477,675 A * | 12/1995 | Ingraham et al. | ............... 60/418 |
| 6,223,852 B1 * | 5/2001 | Mukai et al. | ................... 701/43 |
| 8,738,232 B2 * | 5/2014 | Kanekawa | ........... B62D 5/0481 701/41 |
| 8,914,195 B2 * | 12/2014 | Lavoie et al. | .................. 701/41 |

(Continued)

FOREIGN PATENT DOCUMENTS

| | | |
|---|---|---|
| DE | 10204005 A1 | 8/2002 |
| JP | 63-043865 A | 2/1988 |

(Continued)

OTHER PUBLICATIONS

Office Action dated Dec. 3, 2013 issued in Japanese Patent Application No. 2013-510809.

(Continued)

*Primary Examiner* — Helal A Algahaim
*Assistant Examiner* — Donald J Wallace
(74) *Attorney, Agent, or Firm* — Sughrue Mion, PLLC; Richard C. Turner (57) ABSTRACT

An electric power steering apparatus is provided which can obtain steering auxiliary power when a steering auxiliary power starting condition is not satisfied and there exists no abnormality in a power source and the like. The electric power steering apparatus controls output of a motor in such a way that through operation of a driver, limited steering auxiliary power that is limited to be smaller than normal steering auxiliary power is exerted on a steering system, and exerts limited steering auxiliary power on the steering system when the vehicle is to be saved, even when due to a vehicle failure or a fuel shortage, the engine stops, so that the load on a driver, which is imposed when the vehicle is moved to a safe place, can be reduced.

8 Claims, 10 Drawing Sheets

(56) References Cited

U.S. PATENT DOCUMENTS

| | | |
|---|---|---|
| 2002/0120378 A1 | 8/2002 | Kawada et al. |
| 2003/0168276 A1* | 9/2003 | Kimura et al. ............... 180/446 |
| 2004/0064228 A1* | 4/2004 | Yamamoto et al. ............ 701/41 |
| 2007/0093954 A1* | 4/2007 | Malone et al. ............... 701/112 |
| 2008/0059026 A1* | 3/2008 | Akiyama ........................ 701/41 |
| 2010/0044146 A1* | 2/2010 | Kasai et al. .................. 180/446 |
| 2011/0015828 A1* | 1/2011 | Shimizu .......................... 701/43 |
| 2011/0066331 A1* | 3/2011 | Yamashita ...................... 701/42 |

FOREIGN PATENT DOCUMENTS

| | | |
|---|---|---|
| JP | 01-208270 A | 8/1989 |
| JP | 1-240368 A | 9/1989 |
| JP | 02-53666 A | 2/1990 |
| JP | 2-53666 A | 2/1990 |
| JP | 8-207801 A | 8/1996 |
| JP | 11-198846 A | 7/1999 |
| JP | 11-321669 A | 11/1999 |
| JP | 2000-190863 A | 7/2000 |
| JP | 2003-312510 A | 11/2003 |
| JP | 2009-120097 A | 6/2009 |
| JP | 2009-292427 A | 12/2009 |

OTHER PUBLICATIONS

Communication dated Feb. 16, 2015, issued by the State Intellectual Property Office of P.R. China in counterpart Chinese application No. 201180064559.5.

Communication dated Aug. 20, 2015 from the European Patent Office in counterpart application No. 11864113.3.

Communication dated Feb. 25, 2016 from the State Intellectual Property Office of the P.R.C. in counterpart application No. 201180064559.5.

Communication dated Aug. 2, 2016 from the State Intellectual Property Office of the P.R.C. in counterpart Application No. 201180064559.5.

* cited by examiner

ELECTRIC POWER STEERING APPARATUS

TECHNICAL FIELD

The present invention relates to an electric power steering apparatus for supporting steering power by use of a motor.

BACKGROUND ART

As is well known, an electric power steering apparatus mounted in a vehicle such as an automobile produces steering auxiliary power by use of a motor that is supplied with electric power from a vehicle battery, which is a main power source, so as to be driven, and supports a driver's steering power by exerting the steering auxiliary power on the steering axle. In general, the electric power steering apparatus is configured in such a way as to support the foregoing steering power when the vehicle is in an operation mode.

However, in the case where the vehicle battery, which is a main power source, fails in such a way that for some causes, the voltage thereof extremely decreases, the motor of the electric power steering apparatus is not sufficiently supplied with an electric current, whereby stable steering auxiliary power cannot be continuously obtained. Thus, to date, it has been proposed to provide an auxiliary power source having a back-up function for the main power source (for example, refer to Patent Document 1).

PRIOR ART REFERENCE

Patent Document

[Patent Document 1] Japanese Patent Application Laid-Open No. 2009-120097

DISCLOSURE OF THE INVENTION

Problems to be Solved by the Invention

However, in the case where there occurs a vehicle failure having no relationship with a vehicle battery, e.g., a vehicle failure such as that due to a fuel shortage in the vehicle or an engine stall, the engine cannot be driven, the electric power steering may not work even when there exists no abnormality in the vehicle battery.

For example, there occurs a case where when a vehicle is stopped at a red light, an engine stall takes place, and hence the engine cannot be started again, the vehicle is moved to a safe place such as a road shoulder; however, even when it is intended to move the vehicle, the engine of which is in the stop mode, the vehicle weight is large, and the electric power steering apparatus does not produce any steering auxiliary power because the vehicle is in the engine stall mode; thus, it is required to exert extremely large steering power on the handwheel. Accordingly, it is anticipated that it is much difficult for the driver to push and move the vehicle to a safe place while operating the handwheel.

As described above, in some cases, only because the steering auxiliary power starting condition is not satisfied, a conventional electric power steering apparatus cannot produce steering auxiliary power, even though there exists no abnormality in the vehicle battery and the steering auxiliary power can sufficiently continue.

The present invention has been implemented in order to solve the foregoing problem in a conventional electric power steering apparatus; the objective thereof is to provide an electric power steering apparatus that can obtain steering auxiliary power when the steering auxiliary power starting condition is not satisfied and there exists no abnormality in the power source and the like.

Means for Solving the Problems

An electric power steering apparatus according to the present invention is provided with a motor that generates output for exerting steering auxiliary power on a steering system, a power source that supplies electric power to the motor, and a control apparatus that controls output of the motor; the electric power steering apparatus is characterized in that the control apparatus controls output of the motor in such a way that through operation of a driver, limited steering auxiliary power that is limited to be smaller than normal steering auxiliary power is exerted on the steering system.

Advantage of the Invention

The electric power steering apparatus controls output of a motor in such a way that through operation of a driver, limited steering auxiliary power that is limited to be smaller than normal steering auxiliary power is exerted on a steering system; therefore, the electric power steering apparatus exerts limited steering auxiliary power on the steering system when the vehicle is to be saved, even when due to a vehicle failure or a fuel shortage, the engine stops, so that the load on a driver, which is imposed when the vehicle is moved to a safe place, can be reduced.

BEST MODE FOR CARRYING OUT THE INVENTION

Embodiment 1

Figure 1:
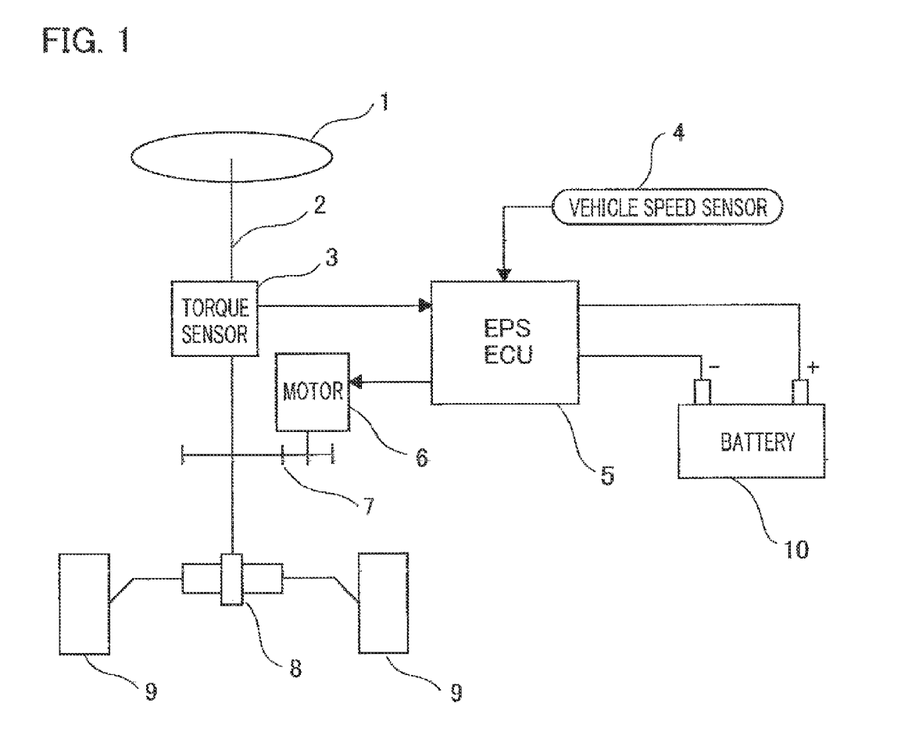
FIG. 1 is a configuration diagram illustrating an electric power steering apparatus according to Embodiment 1 of the present invention.

Hereinafter, an electric power steering apparatus according to Embodiment 1 of the present invention will be explained with reference to the accompanying drawings. FIG. 1 is a configuration diagram illustrating an electric power steering apparatus according to Embodiment 1 of the present invention. In FIG. 1, a steering 1 of a vehicle is coupled with a rack-and-pinion mechanism 8 through the intermediary of a steering shaft 2. Front wheels 9, which are steering wheels of the vehicle are coupled with the rack-and-pinion mechanism 8; steering is performed by means of the rack-and-pinion mechanism 8, based on steering power exerted on the steering 1 by a driver of the vehicle.

The electric power steering apparatus according to Embodiment 1 of the present invention is provided with a motor 6 coupled with the steering shaft 2 through the intermediary of a gear 7, an electric power steering controller (referred to as EPS·ECU, hereinafter) 5 that controls the motor 6, a torque sensor 3 provided on the steering shaft 2, and a vehicle speed sensor 4 that detects a vehicle speed. A vehicle battery 10 supplies electric power to EPS·ECU 5.

The torque sensor 3 mounted on the steering shaft 2 detects steering torque produced by a driver who operates the steering 1 and inputs the steering torque, as a steering torque signal, to EPS·ECU5. The vehicle speed sensor 4 detects a vehicle speed and inputs the vehicle speed, as a vehicle speed signal, to EPS·ECU5. EPS·ECU5 calculates steering auxiliary power based on the inputted steering torque signal and vehicle speed signal and controls the motor 6 so that the calculated steering auxiliary power is exerted on the steering shaft 2 through the intermediary of the gear 7. This is an ordinary steering auxiliary power exerting operation in an electric power steering apparatus.

Figure 2:
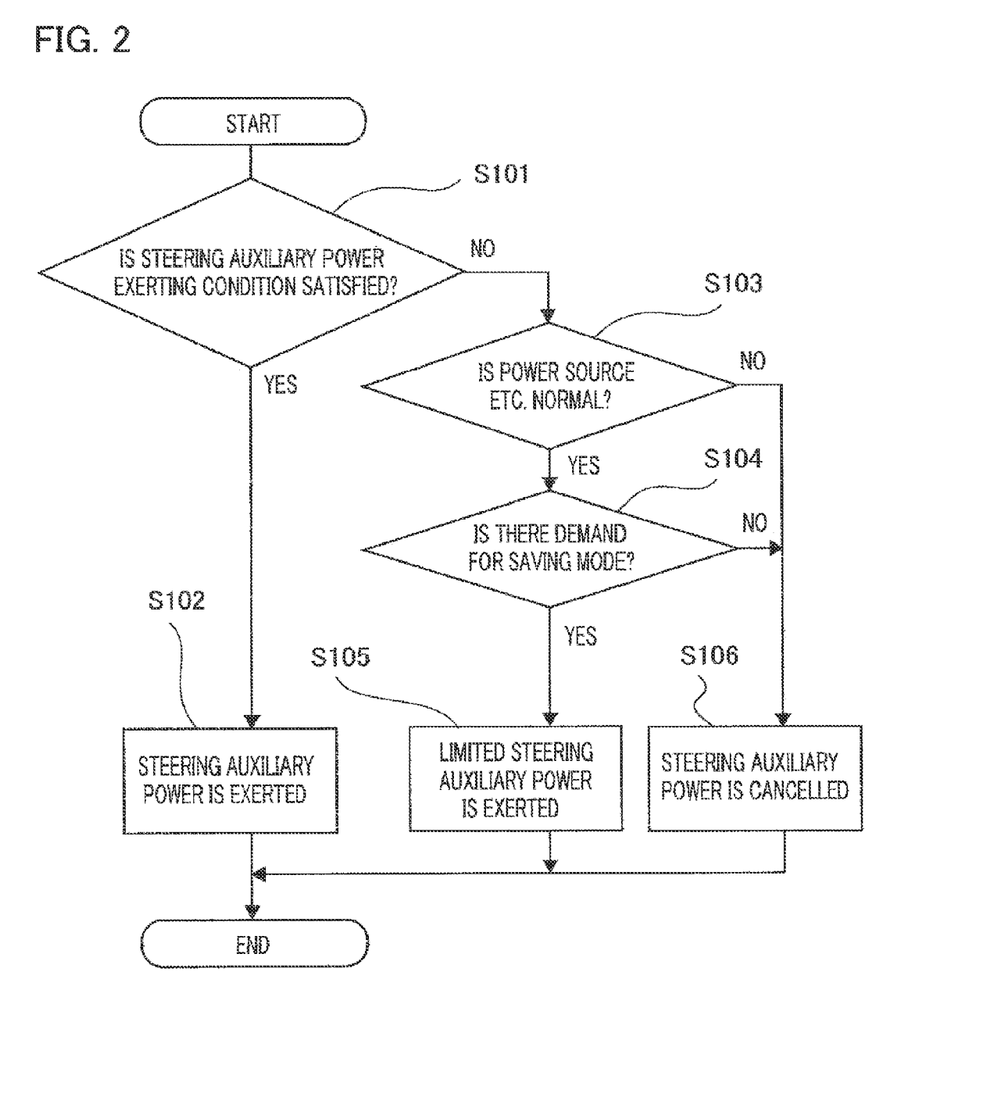
FIG. 2 is a flowchart representing the operation of an electric power steering apparatus according to Embodiment 1 of the present invention.

Next, the operation of the electric power steering apparatus according to Embodiment 1 of the present invention will be explained. FIG. 2 is a flowchart representing the operation of an electric power steering apparatus according to Embodiment 1 of the present invention. In FIG. 2, firstly, it is determined in the step S101 whether or not steering auxiliary power can be exerted, i.e., whether or not the steering auxiliary power exerting condition is satisfied. In the case where the steering auxiliary power exerting condition is satisfied, the engine rotation speed is, for example, the same as or higher than 1000 [rpm], the alternator generates electric power, and hence electric power is sufficiently supplied.

In the case where it is determined in the step S101 that the steering auxiliary power exerting condition is satisfied (YES), the steering torque signal, which is the output of the torque sensor 3, and the vehicle speed signal, which is the output of the vehicle speed sensor 4, are inputted to EPS·ECU5, and the foregoing ordinary steering auxiliary power exerting operation is performed in the step S102.

In contrast, in the case where it is determined in the step S101 that the steering auxiliary power exerting condition is not satisfied (NO), for example, in the case where due to a vehicle failure or a fuel shortage, the engine stops, the step S101 is followed by the step S103. In the step S103, it is determined whether or not the power source and the like such as the battery 10, which supplies electric power to EPS·ECU5 and the like of the electric power steering apparatus, and the power source supply system are normal; then, in the case where it is determined that the power source and the like are not normal (NO), the steering auxiliary power is cancelled in the step S106.

However, in the case where it is determined in the step S103 that the power source and the like such as the power source supply system and the like are not normal (YES), the step S103 is followed by the step S104, where it is determined whether or not there exists a demand for the saving mode. In the case where it is determined in the step S104 that there exists a demand for the saving mode (YES), the step S104 is followed to the saving mode, where the motor 6 is controlled so that limited steering auxiliary power is exerted on the steering shaft 2. The limited steering auxiliary power is exerted, for example, by limiting the motor current so that it becomes smaller than the ordinary value thereof. As a result, minimally necessary steering auxiliary power for moving the vehicle to a safe place can be secured, and a load on the driver can be reduced.

In the case where it is determined in the step S103 that the power source and the like are not normal (NO) or in the case where it is determined in the step S104 that there exists no demand for the saving mode (NO), the step S103 or the step S104 is followed by the step S106, where the steering auxiliary power is cancelled.

In the foregoing electric power steering apparatus according to Embodiment 1 of the present invention, in the case where the steering auxiliary power exerting condition is satisfied, the power source and the like are normal, and there exists a demand for the saving mode, limited steering auxiliary power is exerted; therefore, Minimally necessary steering auxiliary power for moving a vehicle to a safe place can be secured, and a load on the driver can be reduced.

Embodiment 2

Figure 3:
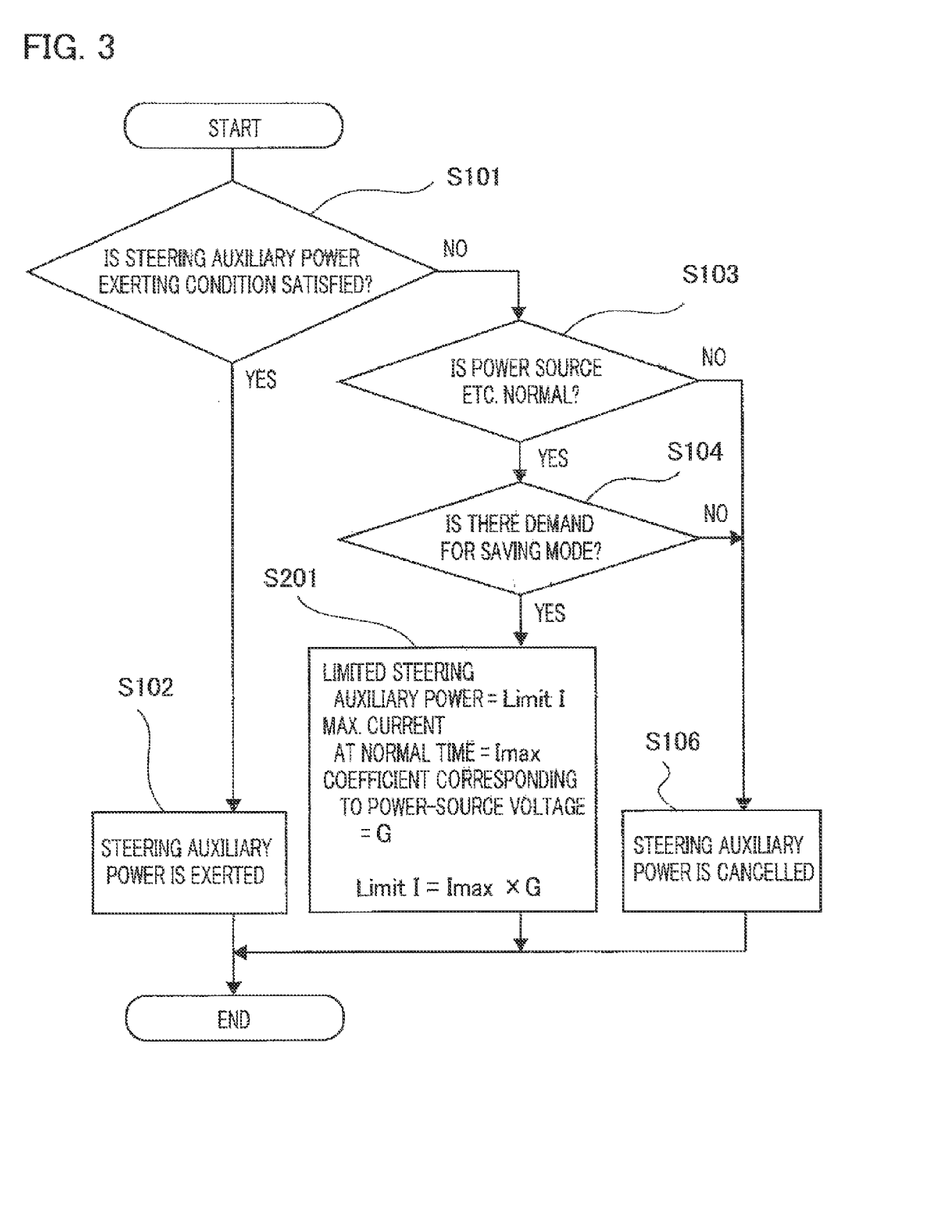
FIG. 3 is a flowchart representing the operation of an electric power steering apparatus according to Embodiment 2 of the present invention.

Next, an electric power steering apparatus according to Embodiment 2 of the present invention will be explained. FIG. 3 is a flowchart representing the operation of an electric power steering apparatus according to Embodiment 2 of the present invention. The steps S101 through S104 and S106 in FIG. 3 are the same as those with the same reference characters, i.e., the steps S101 through S107 and S106 in FIG. 2.

In FIG. 3, in the case where a vehicle fails or in the case where due to fuel shortage, the engine does not operate, the steering auxiliary power exerting condition is not satisfied in the step S101 (NO); then, in the step S103, it is determined whether or not the power source and the like such as the battery 10 that supplies electric power to the electric power steering apparatus, the power source supply system, and the like are normal; in the case where it is determined that there exists an abnormality in the power source and the like (NO), the step S103 is followed by the step S106, where the steering auxiliary power is cancelled.

In contrast, in the case where it is determined in the step S103 that the power source and the like such as the power source supply system and the like are normal (YES), the step S103 is followed by the step S104; then, in the case where it is determined that there exists a demand for the saving mode (YES), the step S104 is followed by the step S201, i.e., the saving mode. In the step S201, the saving mode is implemented in the following manner.

Figure 4:
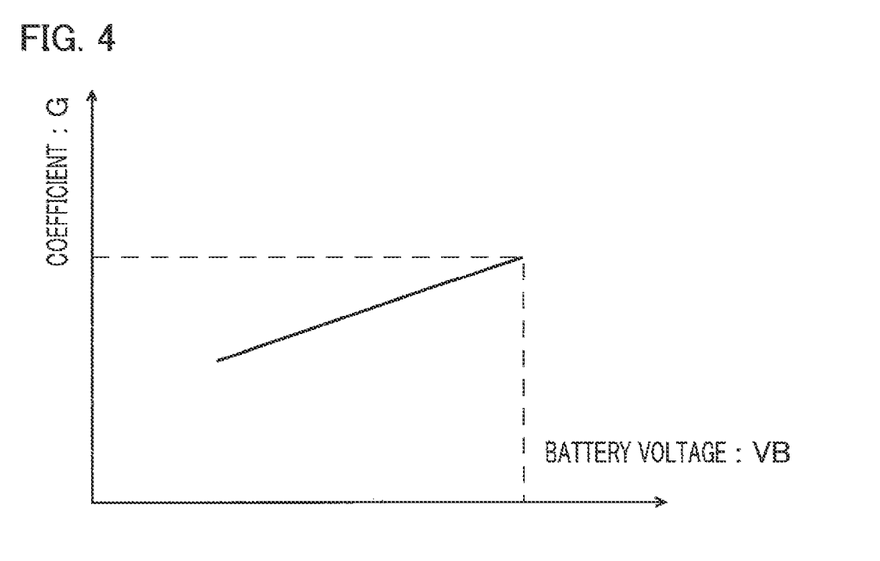
FIG. 4 is an explanatory graph for explaining the operation of an electric power steering apparatus according to Embodiment 2 of the present invention.

FIG. 4 is an explanatory graph for explaining the operation of an electric power steering apparatus according to Embodiment 2 of the present invention; the abscissa denotes a battery voltage VB of the battery 10, and the ordinate denotes a coefficient G. From the characteristic of the coefficient G vs. the battery voltage in FIG. 4, the coefficient G for the battery voltage VB is obtained; then, a current limit I is calculated through the equation (1).

$$\text{Limit } I = I\text{max} \times G \quad (1)$$

where Imax is a maximum current at a time when the power source and the like are normal.

As described above, based on the coefficient G set in accordance with the battery voltage VB, the current to be supplied to the motor 6 is limited, so that limited steering auxiliary power is exerted on the steering shaft 2.

In the foregoing electric power steering apparatus according to Embodiment 2 of the present invention, for example, even in the case where the battery 10 has deteriorated, limited steering auxiliary power corresponding to the power supply amount from the battery 10 is produced; therefore, steering auxiliary power for moving a vehicle to a safe place is exerted, and hence the driver's steering operation power can be reduced.

Embodiment 3

Figure 5:
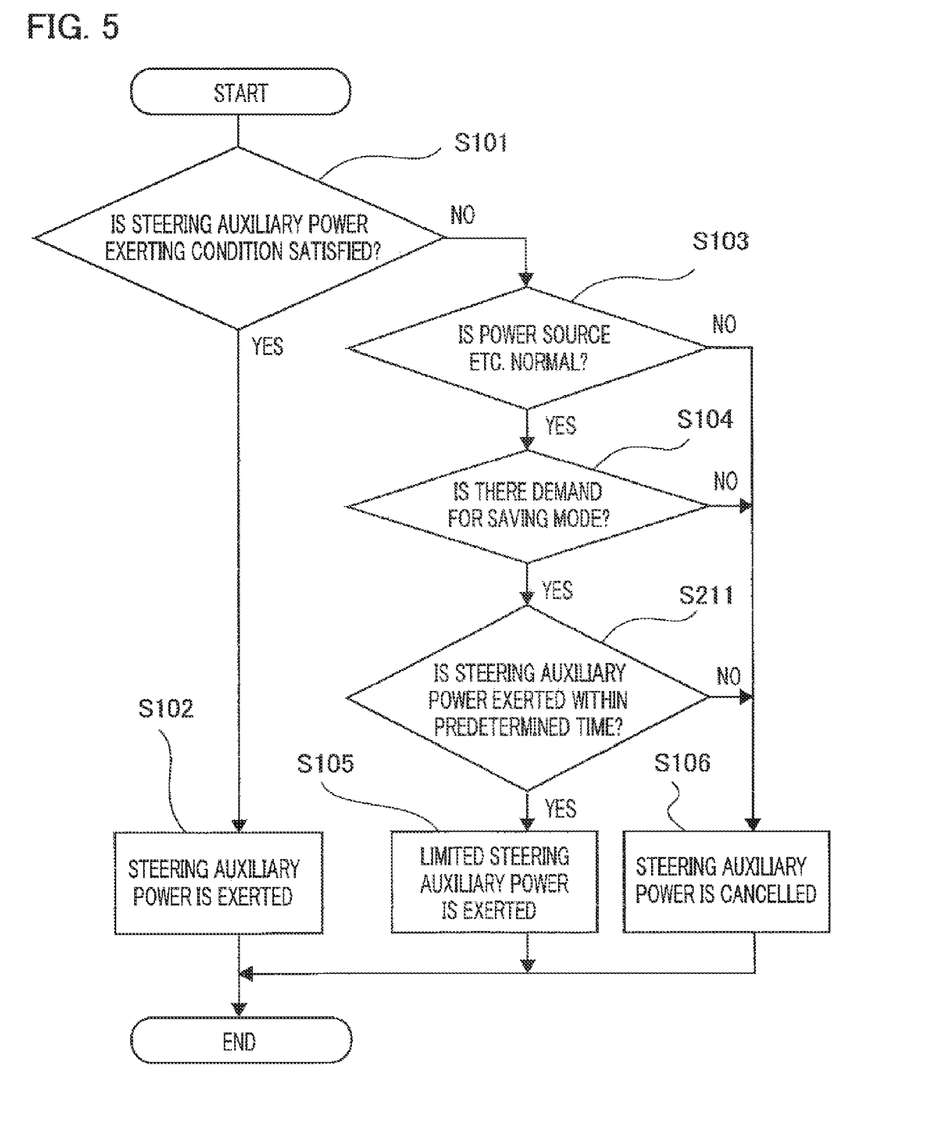
FIG. 5 is a flowchart representing the operation of an electric power steering apparatus according to Embodiment 3 of the present invention.

Next, an electric power steering apparatus according to Embodiment 3 of the present invention will be explained. FIG. 5 is a flowchart representing the operation of an electric power steering apparatus according to Embodiment 3 of the present invention. The steps S101 through S106 in FIG. 5 are the same as those with the same reference characters, i.e., the steps S101 through S106 in FIG. 2.

In foregoing Embodiment 1, in the case where there exists a demand for the saving mode, the implementation time for the saving mode is not limited; however, because the power source is supplied only by the battery 10, the battery 10 may fail to function in good order. Accordingly, in Embodiment 3 of the present invention, the implementation time for the saving mode in which a vehicle is saved at a safe place is limited.

In other words, in FIG. 5, in the case where it is determined in the step S104 that there exists a demand for the saving mode (YES), it is determined in the step S211 whether or not the steering auxiliary power has been exerted within a predetermined time. In the case where it is determined in the step S211 that the steering auxiliary power has been exerted within a predetermined time (YES), limited steering auxiliary power is exerted in the step S105; in the case where it is determined that the steering auxiliary power has not been exerted within a predetermined time (NO), the step S211 is followed by the step S106, where exertion of the steering auxiliary power is cancelled.

In the foregoing electric power steering apparatus according to Embodiment 3 of the present invention, limited steering auxiliary power is exerted when steering auxiliary power has been exerted within a predetermined time; therefore, the battery 10, which is a power source, does not fail to function in good order, whereby the time in which electric power is supplied to the electric power steering apparatus can be prolonged even in the case where the vehicle is moved again.

Embodiment 4

Figure 6:
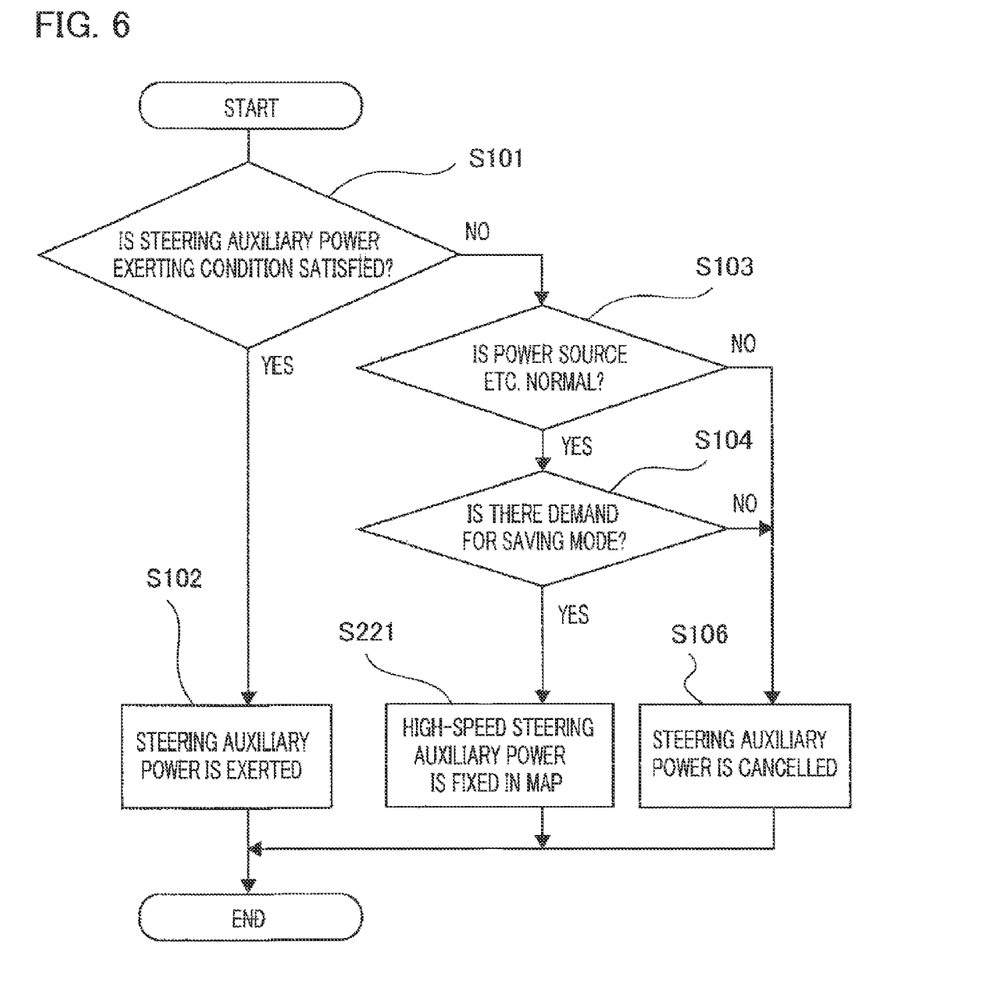
FIG. 6 is a flowchart representing the operation of an electric power steering apparatus according to Embodiment 4 of the present invention.

Next, an electric power steering apparatus according to Embodiment 4 of the present invention will be explained. FIG. 6 is a flowchart representing the operation of an electric power steering apparatus according to Embodiment 4 of the present invention. The steps S101 through S104 and S106 in FIG. 6 are the same as those with the same reference characters, i.e., the steps S101 through S104 and S106 in FIG. 2.

In foregoing Embodiment 1, in the case where there exists a demand for the saving mode, power supply is not limited in the saving mode; however, in Embodiment 4, because steering auxiliary power is not required so much in the saving mode, a steering auxiliary power map, which is utilized in the high-speed mode, is utilized.

Figure 7:
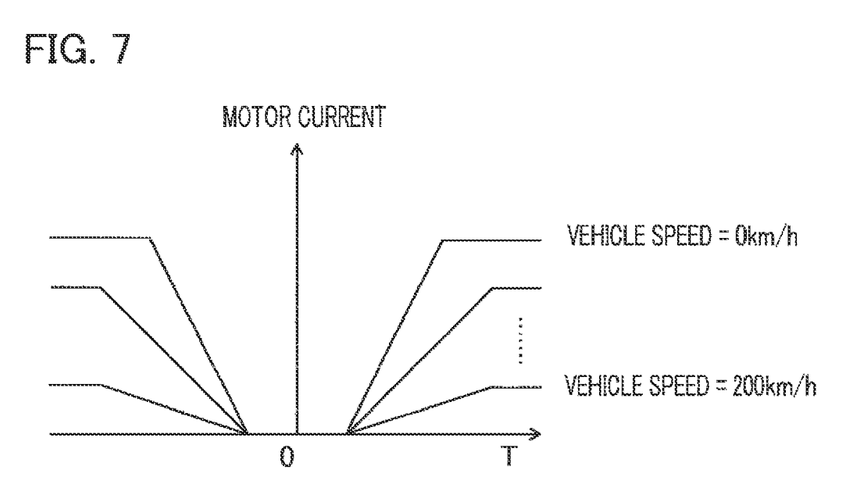
FIG. 7 is an explanatory graph for explaining the operation of an electric power steering apparatus according to Embodiment 4 of the present invention.

FIG. 7 is an explanatory graph for explaining the operation of an electric power steering apparatus according to Embodiment 4 of the present invention. In the case where steering auxiliary power is exerted in a normal manner, a steering auxiliary power map, as represented in FIG. 7, that is stored in EPS·ECU5 is utilized so that steering auxiliary power corresponding to the vehicle speed is exerted. Accordingly, in FIG. 6, in the case where it is determined in the step S104 that there exists a demand for the saving mode (YES), steering auxiliary power is fixed, in the step S221, to a high-speed steering auxiliary power map represented in FIG. 7, e.g., to a steering auxiliary power map for the vehicle speed 200 [km/h].

In the foregoing electric power steering apparatus according to Embodiment 4 of the present invention, in the saving mode, the steering auxiliary power is fixed to a steering auxiliary power map, which is utilized in the high-speed mode in which steering auxiliary power is not required so much; therefore, power supply to the motor 6 can be suppressed; thus, although the steering auxiliary power is limited, there can be prolonged the time in which the steering auxiliary power for moving a vehicle to a safe place is secured.

Embodiment 5

Figure 8:
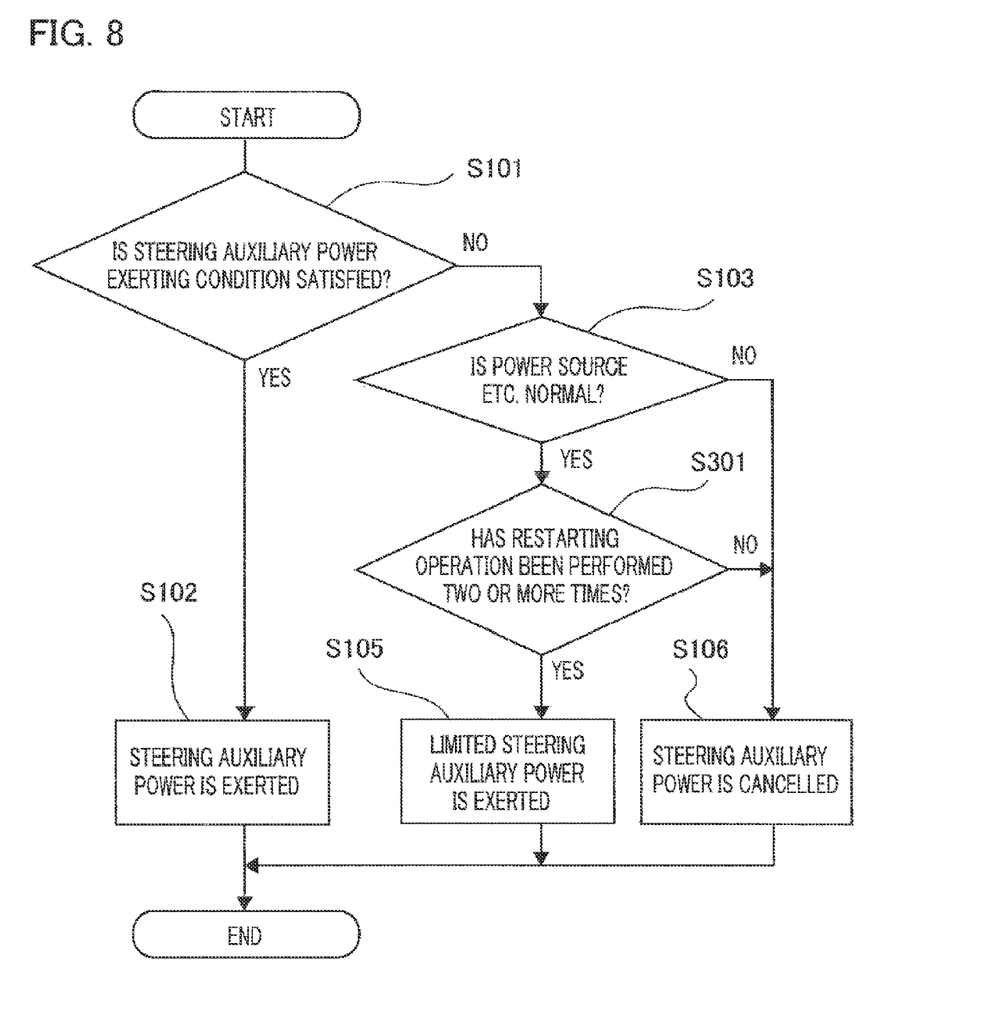
FIG. 8 is a flowchart representing the operation of an electric power steering apparatus according to Embodiment 5 of the present invention.

Next, an electric power steering apparatus according to Embodiment 5 of the present invention will be explained. FIG. 8 is a flowchart representing the operation of an electric power steering apparatus according to Embodiment 5 of the present invention. The steps S101 through S103, S105, and S106 in FIG. 8 are the same as those with the same reference characters, i.e., the steps S101 through S103, S105, and S106 in FIG. 2.

In Embodiment 5, whether or not there exists a demand for the saving mode is determined depending on whether or not engine restarting operation has been performed two or more times. In other words, in FIG. 8, in the case where it is determined in the step S101 that because the engine is stopped, the steering auxiliary power exerting operation is not satisfied (NO) and then in the case where it is determined in the step S103 that the power source and the like are normal (YES), it is determined in the step S301 whether or not engine restarting operation has been performed two or more times within a predetermined time; in the case where it is determined that engine restarting operation has been performed two or more times (YES), the step S301 is followed by the step S105, where limited steering auxiliary power is exerted.

In contrast, in the case where it is determined in the step S301 that engine restarting operation has not been performed two or more times (NO), the step S301 is followed by the step S106, where the exertion of steering auxiliary power is cancelled.

In the foregoing electric power steering apparatus according to Embodiment 5 of the present invention, whether or not there exists a demand for the saving mode is determined depending on whether or not engine restarting operation has been performed two or more times; therefore, it can readily be performed whether or not there exists a demand for the saving mode.

Embodiment 6

Figure 9:
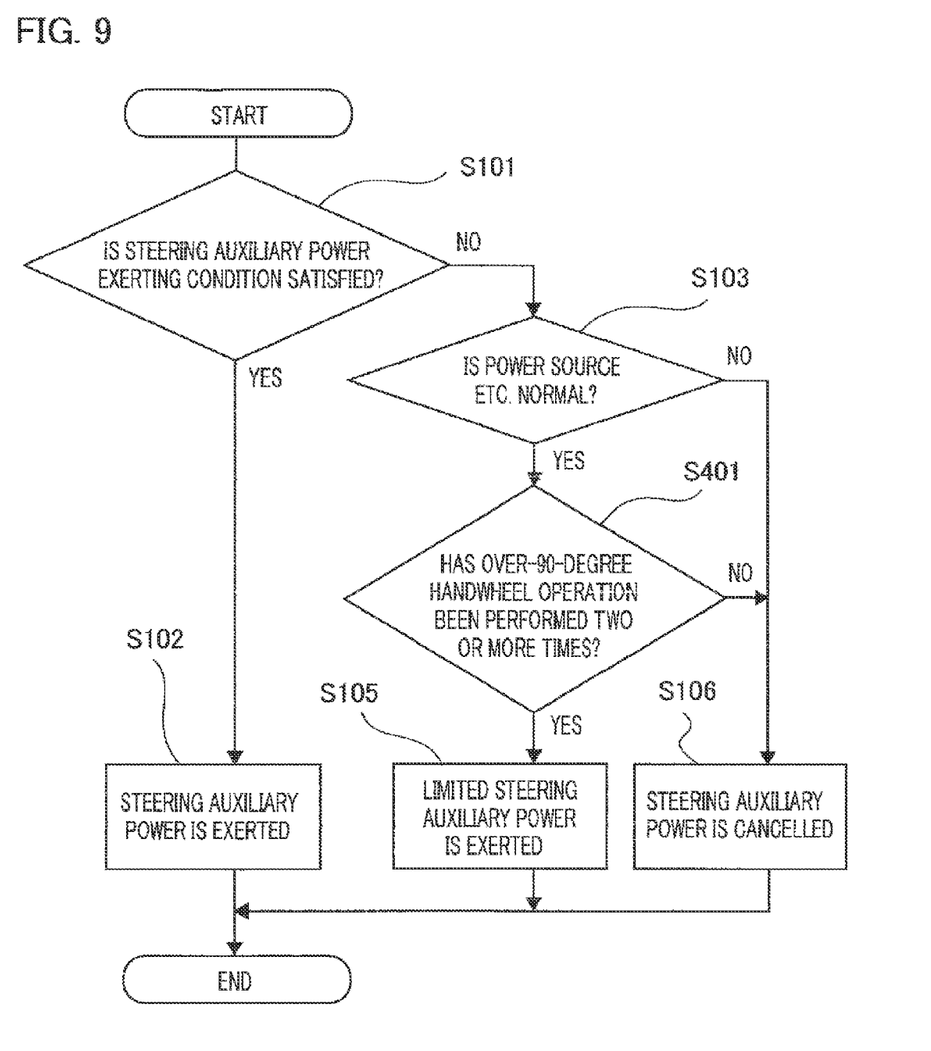
FIG. 9 is a flowchart representing the operation of an electric power steering apparatus according to Embodiment 6 of the present invention.

Next, an electric power steering apparatus according to Embodiment 6 of the present invention will be explained. FIG. 9 is a flowchart representing the operation of an electric power steering apparatus according to Embodiment 6 of the present invention. The steps S101 through S103, S105, and S106 in FIG. 9 are the same as those with the same reference characters, i.e., the steps S101 through S103, S105, and S106 in FIG. 2.

In Embodiment 6, whether or not there exists a demand for the saving mode is determined depending on whether or not over-90-degree operation of the steering 1, i.e., the handwheel has been performed two or more times. In other words, in FIG. 9, in the case where it is determined in the step S101 that because the engine is stopped, the steering auxiliary power exerting operation is not satisfied (NO) and then in the case where it is determined in the step S103 that the power source and the like are normal (YES), it is determined in the step S401 whether or not over-90-degree operation of the handwheel has been performed two or more times; in the case where it is determined that over-90-degree operation of the handwheel has been performed two or more times (YES), the step S401 is followed by the step S105, where limited steering auxiliary power is exerted.

In contrast, in the case where it is determined in the step S401 that over-90-degree operation of the handwheel has not been performed two or more times (NO), the step S401 is followed by the step S106, where the exertion of steering auxiliary power is cancelled.

In the foregoing electric power steering apparatus according to Embodiment 6 of the present invention, whether or not there exists a demand for the saving mode is determined depending on whether or not over-90-degree operation of the handwheel has been performed two or more times; therefore, it can readily be performed whether or not there exists a demand for the saving mode.

Embodiment 7

Figure 10:
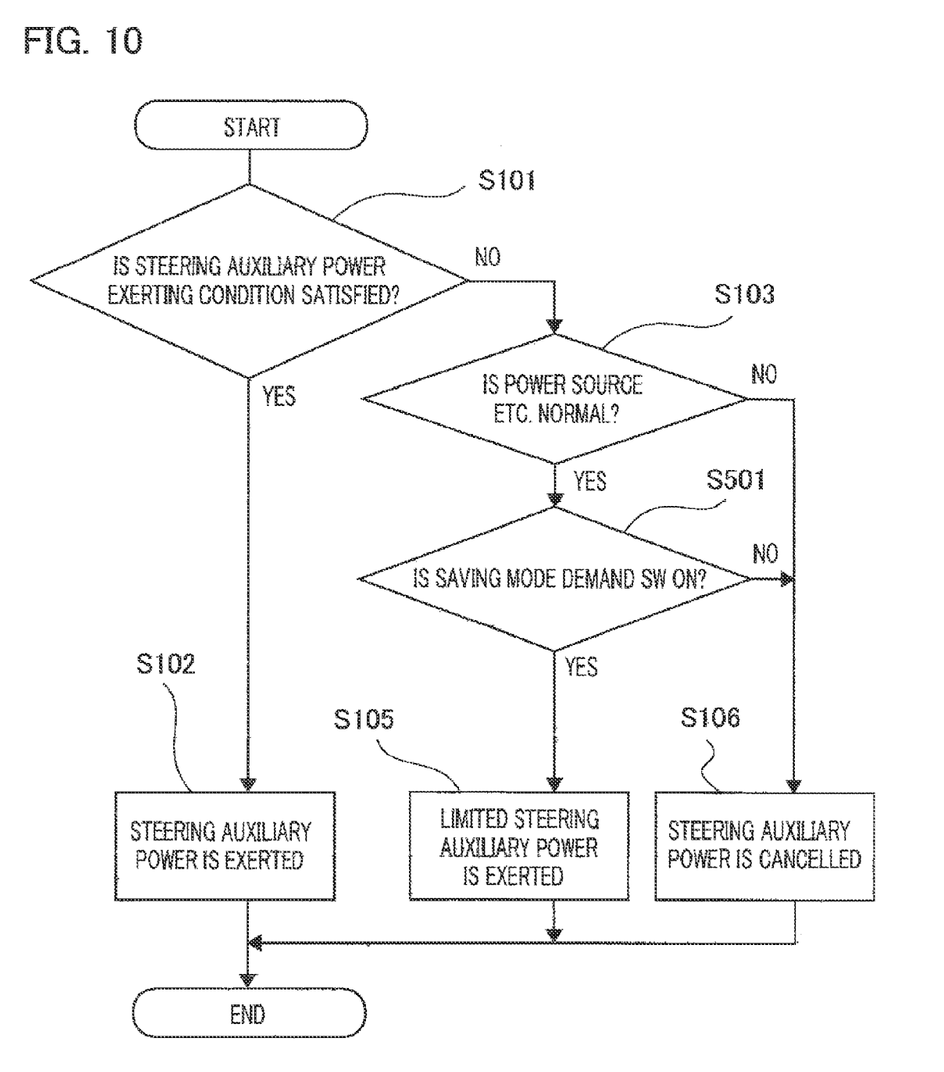
FIG. 10 is a flowchart representing the operation of an electric power steering apparatus according to Embodiment 7 of the present invention.

Next, an electric power steering apparatus according to Embodiment 7 of the present invention will be explained. FIG. 10 is a flowchart representing the operation of an electric power steering apparatus according to Embodiment 7 of the present invention. The steps S101 through S103, S105, and S106 in FIG. 10 are the same as those with the same reference characters, i.e., the steps S101 through S103, S105, and S106 in FIG. 2.

In Embodiment 7, a saving mode demand switch is provided, and it is determined whether or not there exists a demand for the saving mode, based on whether the saving mode demand switch is ON or OFF. In other words, in FIG. 10, in the case where it is determined in the step S101 that because the engine is stopped, the steering auxiliary power exerting operation is not satisfied (NO) and then in the case where it is determined in the step S103 that the power source and the like are normal (YES), it is determined in the step S501 whether the saving mode demand switch is ON or OFF; in the case where it is determined that the saving mode demand switch is ON (YES), the step S501 is followed by the step S105, where limited steering auxiliary power is exerted.

In contrast, in the case where it is determined in the step S501 that the saving mode demand switch is not ON (NO), the step S501 is followed by the step S106, where the exertion of steering auxiliary power is cancelled.

As the saving mode demand switch, a signal such as that for in-vehicle communication may be utilized instead of a hardware switch.

In the foregoing electric power steering apparatus according to Embodiment 6 of the present invention, a signal generated when the saving mode demand switch is ON is inputted to EPS·ECU5, so that it can be recognized that there exists a demand for the saving mode; therefore, the driver's intention of demanding the saving mode is made clear, whereby it can be prevented that the saving mode is inappropriately determined.

INDUSTRIAL APPLICABILITY

The present invention can be applied to the field of the automobile industry, especially, to the field of an automobile electric power steering apparatus.

DESCRIPTION OF REFERENCE NUMERALS

1: steering
2: steering shaft
3: torque sensor
4: vehicle speed sensor
5: EPS·ECU
6: motor
7: gear
8: rack-and-pinion mechanism
9: wheel
10: battery

The invention claimed is:

1. An electric power steering apparatus for a vehicle, comprising:
   a motor that generates output for exerting steering auxiliary power on a steering system;
   a power source that supplies electric power to the motor; and
   a control apparatus that controls output of the motor, wherein in the case where a driver conducts an operation for requesting transition to a saving mode, the control apparatus determines that a present timing is an implementation time for the saving mode for the vehicle and then controls output of the motor in such a way that limited steering auxiliary power that is limited to be smaller than normal steering auxiliary power is exerted on the steering system.

2. The electric power steering apparatus according to claim 1, wherein the control apparatus limits a current supplied from the power source to the motor in comparison with a normal current so that the limited steering auxiliary power is exerted.

3. The electric power steering apparatus according to claim 1, wherein the limited steering auxiliary power is exerted within a predetermined time.

4. The electric power steering apparatus according to claim 1, wherein the limited steering auxiliary power is exerted based on data on high-speed-driving steering auxiliary power stored in the control apparatus.

5. The electric power steering apparatus according to claim 1, wherein when over-predetermined-angle operation of a handwheel of the vehicle has been performed two or more times, the limited steering auxiliary power is exerted.

6. The electric power steering apparatus according to claim 1, further including a switch that is operated when a vehicle is transitioned to the saving mode, wherein when the switch has been operated, the limited steering auxiliary power is exerted.

7. An electric power steering apparatus comprising:
   a motor that generates output for exerting steering auxiliary power on a steering system;
   a power source that supplies electric power to the motor; and
   a control apparatus that controls output of the motor, wherein in a case where a driver conducts an operation for requesting transition to a saving mode, the control apparatus determines that a present timing is an implementation time for the saving mode for the vehicle and then controls output of the motor in such a way that limited steering auxiliary power that is limited to be smaller than normal steering auxiliary power is exerted on the steering system, wherein the control apparatus limits a current supplied from the power source to the motor in comparison with a normal current so that the limited steering auxiliary power is exerted, and wherein the control apparatus limits the current, based on a method of multiplying a maximum motor current at a time when the power source is in a normal state by a coefficient corresponding to the voltage of the power source.

8. An electric power steering apparatus comprising:

a motor that generates output for exerting steering auxiliary power on a steering system;

a power source that supplies electric power to the motor; and a control apparatus that controls output of the motor, wherein in a case where a driver conducts an operation for requesting transition to a saving mode, the control apparatus determines that a present timing is an implementation time for the saving mode for the vehicle and then controls output of the motor in such a way that limited steering auxiliary power that is limited to be smaller than normal steering auxiliary power is exerted on the steering system, wherein only upon a condition that a restarting operation of a vehicle has been performed two or more times, the limited steering auxiliary power is exerted.

* * * * *